(12) United States Patent
Davis et al.

(10) Patent No.: US 7,703,100 B2
(45) Date of Patent: Apr. 20, 2010

(54) MODIFIED AUTO REMOTE AGENT FOR JOB SCHEDULING AND MANAGEMENT APPLICATIONS

(75) Inventors: Bradford C. Davis, Erie, CO (US); Nick Minchenko, Lewis Center, OH (US)

(73) Assignee: Computer Associates Think, Inc., Islandia, NY (US)

( * ) Notice: Subject to any disclaimer, the term of this patent is extended or adjusted under 35 U.S.C. 154(b) by 1130 days.

(21) Appl. No.: 10/890,415

(22) Filed: Jul. 12, 2004

(65) Prior Publication Data

US 2005/0022195 A1 Jan. 27, 2005

Related U.S. Application Data

(60) Provisional application No. 60/486,589, filed on Jul. 11, 2003.

(51) Int. Cl.
*G06F 9/46* (2006.01)
*G06F 3/00* (2006.01)
*G06F 15/16* (2006.01)

(52) U.S. Cl. ............ 718/102; 718/100; 718/106; 719/313; 709/223; 709/224; 709/225

(58) Field of Classification Search .......... 718/100, 718/102, 106; 719/313; 709/223–225
See application file for complete search history.

(56) References Cited

U.S. PATENT DOCUMENTS

| | | | | |
|---|---|---|---|---|
| 5,442,791 A | * | 8/1995 | Wrabetz et al. ............. | 719/330 |
| 5,544,316 A | * | 8/1996 | Carpenter et al. ........... | 719/310 |
| 6,148,323 A | * | 11/2000 | Whitner et al. ............. | 718/105 |
| 6,154,751 A | * | 11/2000 | Ault et al. ................... | 707/201 |
| 6,480,877 B1 | * | 11/2002 | O'Donnell et al. .......... | 718/100 |
| 7,028,303 B2 | * | 4/2006 | Lahey et al. ................ | 718/106 |
| 7,096,249 B2 | * | 8/2006 | Rajic et al. ................. | 709/201 |
| 7,124,403 B2 | * | 10/2006 | Price et al. ................. | 717/127 |
| 7,356,820 B2 | * | 4/2008 | Bower, III .................. | 718/103 |
| 2003/0005110 A1 | * | 1/2003 | Corbin et al. .............. | 709/224 |
| 2003/0059004 A1 | * | 3/2003 | Jiang et al. ............... | 379/88.17 |
| 2004/0103175 A1 | * | 5/2004 | Rothman et al. ............ | 709/222 |
| 2004/0148385 A1 | * | 7/2004 | Srinivasan et al. .......... | 709/224 |

FOREIGN PATENT DOCUMENTS

JP 2000148783 A * 5/2000

OTHER PUBLICATIONS

Douglis, Fred and Ousterhout, John. "Transparent Process Migration: Design Alternatives and the Sprite Implementation", Feb. 1991, University of California—Berkeley, pp. 1-32.*
Ko, Calvin et al., "Automated detection of vulnerabilities in privileged programs by execution monitoring", Dec. 1994, Computer Security Applications Conference, pp. 134-144.*
Silberschatz, Abraham et al., "Operating System Concepts", 1999, John Wiley & Sons, Inc., Fifth Edition, pp. 50, 55, 89-123, and 476.*

* cited by examiner

*Primary Examiner*—Meng-Ai An
*Assistant Examiner*—Kenneth Tang
(74) *Attorney, Agent, or Firm*—Baker Botts L.L.P.

(57) ABSTRACT

A system and method for scheduling and managing computer applications is provided. In one embodiment, an event processor dispatches messages to run a job to an agent module residing on a local or remote node. The agent module, upon receiving the messages, spawns processes to run the job, returning status notifications of the running job to the event processor.

23 Claims, 3 Drawing Sheets

MODIFIED AUTO REMOTE AGENT FOR JOB SCHEDULING AND MANAGEMENT APPLICATIONS

CROSS-REFERENCE TO RELATED APPLICATIONS

This application claims the benefit of U.S. Provisional Patent Application No. 60/486,589 entitled MODIFIED AUTO REMOTE AGENT FOR JOB SCHEDULING AND MANAGEMENT APPLICATIONS filed on Jul. 11, 2003, the entire disclosure of which is incorporated herein by reference.

TECHNICAL FIELD

This application relates generally to computer systems, and more particularly to scheduling and managing computer processes.

BACKGROUND

Remote agents running on remote machines typically require or depend on the database vendor client software on the remote nodes. Further dependence on a specific operating system service burdens many database system management procedures. Accordingly, an agent that does not depend on specific database vendor client software or specific operating systems to improve job scheduling and management application is desirable.

SUMMARY

System and method for automatic remote agent used for job scheduling and managing application processes are provided. In one aspect, the method includes receiving a message from an event processor to initiate a job on a node. The agent spawns a child process on the node to run the job. Upon completion of the job, whether successfully terminated or an error occurred, the child process exits. The agent receives the status associated with the job from the child process and sends the status, for example, so that a database of jobs can be updated.

The system in one aspect includes an event processor operable to retrieve one or more jobs from a database. The one or more jobs are scheduled to be run on a node whether remote or local. An agent module residing on the node receives the one or more jobs from the event processor. The agent module creates a child process to run the job on the node. The agent module receives status of the job from the child process.

Further features as well as the structure and operation of various embodiments are described in detail below with reference to the accompanying drawings. In the drawings, like reference numbers indicate identical or functionally similar elements.

DETAILED DESCRIPTION

Figure 1:
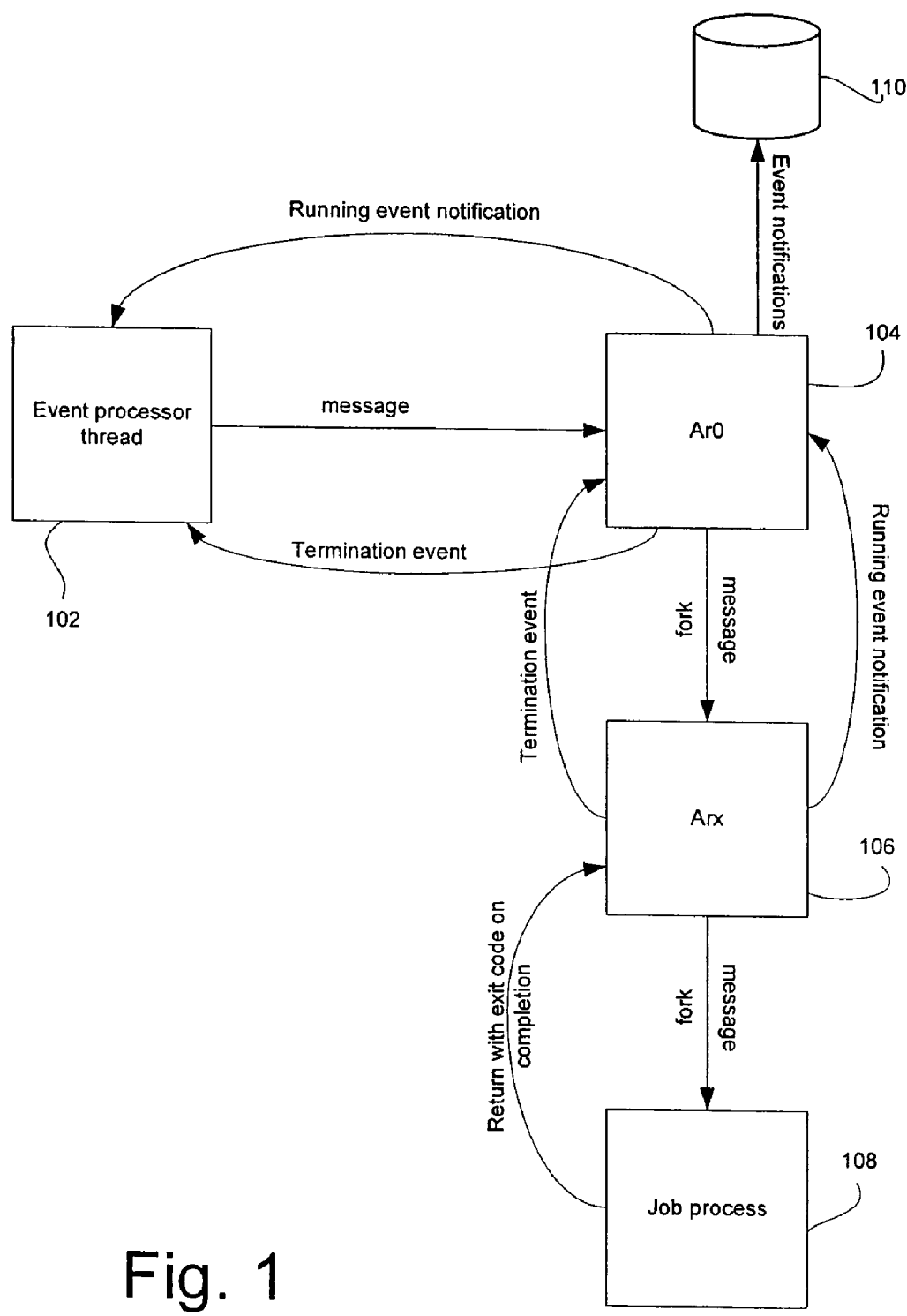
FIG. 1 is a block diagram illustrating the components of the present disclosure in one embodiment.

The present disclosure provides a modified remote agent such as the auto_remote used, for instance, with job scheduling and management applications such as the Unicenter AutoSys Job Management application. FIG. 1 is a block diagram illustrating the components of the present disclosure in one embodiment. The modified remote agent of the present disclosure in one embodiment includes two processes, for example, ar0 104 and arx 106, that do not rely on operating system services such as the inet_d service, and that do not use database vendor client software on the node running the modified remote agent. Briefly, inet_d refers to a daemon program that listens for connection requests or messages for selected ports and starts server programs to perform the services associated with those ports.

In this embodiment, the ar0 process 104 receives messages from the event processor 102, forks an arx process 106 and passes an event processor message to the arx process 106. The arx process 106 then forks and exec's the child fork into the client job 108 to be run on the remote node. The parent arx process 106 passes a running event notification to the ar0 process 104 and the ar0 104 passes that event directly back to the event processor 102. The Event processor 102 may pass the results to a database system 110. In another aspect, the ar0 process 104 may directly communicate or pass the results to a database system 110. In one embodiment, event processor 102, ar0, 104, arx 106 and job 108 are thread processes.

When the client job 108 terminates, the arx 106 catches the exit code of the child process 108, creates and passes a termination event to the ar0 process 104 at which point the arx process 106 terminates and the ar0 104 passes that termination event back to the event processor 102. Ar0 104 also then terminates.

In this ways, the event processor need not contact the operating system inet_d service to fork and exec the child fork into the pre-existing auto remote agent. Thus, an embodiment of the present disclosure removes the operating system service from this process and uses the ar0 process instead. By not using inet_d, various security issues are alleviated.

The present application also handles events generated by the auto remote. The pre-existing auto remote would use the database vendor client software to gain a database connection and insert the running and termination events into the job scheduling and management application's database. Job scheduling and management applications access this information from the database. However, these raw events were unprocessed and needed to be extracted from the database for processing by the event processor. An embodiments of the present application utilize the arx 106 and ar0 104 to pass the events directly to the event processor 102 for processing. The intermediate step has been bypassed. In the present application, there is no need to gain the database connection by the remote agent, and the intermediate insertion and retrieval into the database are not needed.

In one embodiment, the present application provides a remote agent that does not require the database vendor client software on the remote nodes. For example, Sybase™ and Oracle™ could be supported databases upon whose reliance the present application seeks to rid on the remote nodes.

Figure 2:
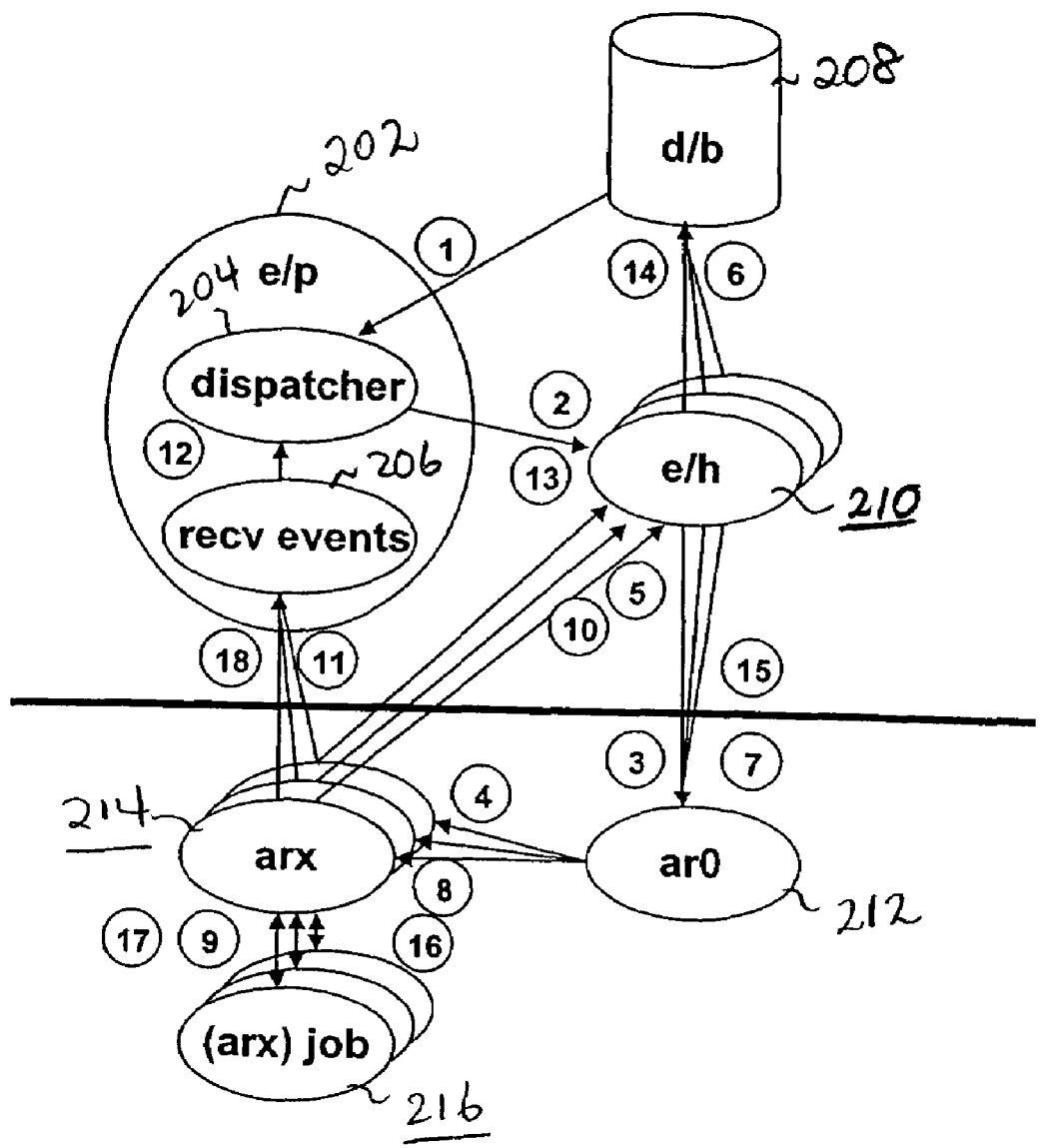
FIG. 2 is a block diagram illustrating the components of the present disclosure in detail in one embodiment.

FIG. 2 is a block diagram illustrating the components of the present disclosure in detail in one embodiment. Event processor 202 receives or retrieves events, for example, from a database server 208. The event processor 202 dispatches the event to an event handler 210, for example, using its dispatcher component 204. The event handler 210 passes the event to an ar0 process 212. The ar0 212, in this embodiment, may act as an inetd proxy. Ar0 212 may be started when a system starts.

Ar0 212 then spawns an arx 214, for example, using a fork system call. Arx 214 acks start_rem_job, acknowledging that it is running a job, and for instance, puts the running event into a database, for example, a job scheduling database table that holds events. The event handler 210 sends to the database 208, marks, and processes STARTING event notification. The event handler 210 also sends encrypted jobs associated with the event to ar0 212. Ar0 212 dispatches encrypted jobs to appropriate arx 214. Arx 214 forks and executes the job 216. Arx 214 sends RUNNING event to a recv events thread 206 of the event processor 202.

Recv events thread 206 sends the same event to the dispatcher 204, which sends the event to the event handler 210. Event handler 210 marks, puts the RUNNING event in event table, and processes RUNNING, for example, prepares for submission to database. Then the event handler 210 acks ar0 212. Arx 214 catches signal, for example, SIGCLD, from the child process, arx job 216, upon termination of the arx job 216. Arx 214 then sends TERM event to recv events thread 206 of the event processor 202. Arx 214 may send the TERM event to database 208 or a server process of the event processor 202.

In one embodiment, arx 214 is an auto_remote which runs inetd-less and/or, database-less.

Figure 3:
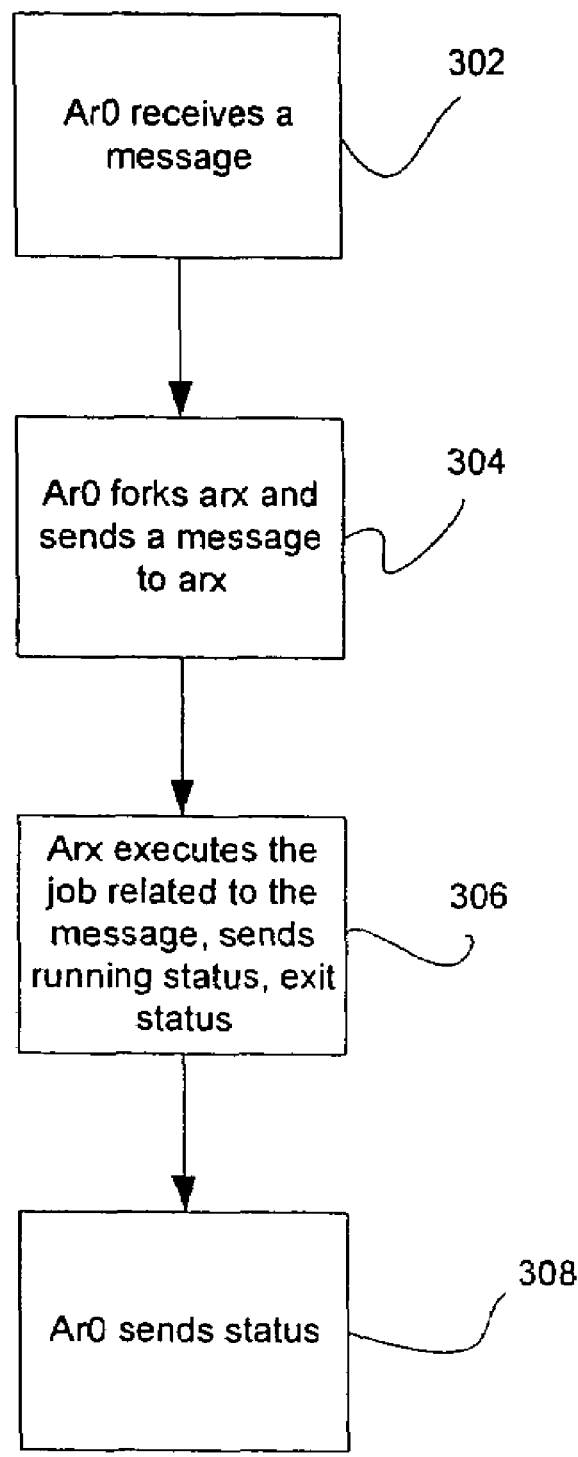
FIG. 3 is a flow diagram illustrating the method of the present disclosure in one embodiment.

FIG. 3 is a flow diagram illustrating the method of the present disclosure in one embodiment. At 302, ar0 receives a message to start a job. The message, for example, may be from an event processor thread. Ar0 may reside on a local or remote node from the thread that sent the message. At 304, ar0 forks a process and runs arx. Ar0 also sends a running status message back to the message sender, for instance, an event processor thread. Optionally, the ar0 may send a message to an event processor server or to a database that holds event state information. At 306, arx executes a job associated with the message. When the job completes, ar0 receives exit status of the job and sends the status to the thread that sent the message at 308.

The system and method of the present disclosure may be implemented and run on a general-purpose computer. For example, the system and method may be implemented as set of computer instructions to be stored on computer memory units and executed on the computer processor. The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. An auto remote agent method for job scheduling and management applications, comprising:
   receiving a message from an event processor to initiate a job on a node, the node located remotely from the event processor;
   using a remote agent on the node to spawn a child process on the node, the child process not relying on operating system services and not relying on vendor-specific client software on the node;
   causing the child process to run the job;
   receiving status associated with the job from the child process, the status indicating that the child process is running the job;
   providing the status indicating that the child process is running the job for updating a database that includes one or more states of one or more jobs, wherein providing the status for updating the database comprises:
   providing the status for updating the database directly from the remote agent to the event processor that is remote from the remote agent;
   performing processing on the status at the event processor that is remote from the remote agent; and
   using the event processor to update the database with the status indicating that the child process is running the job;
   catching the exit code of the child process;
   terminating the child process at the remote agent; and
   passing a termination event to the event processor.

2. The method of claim 1, wherein the database is located remotely from the node.

3. The method of claim 1, wherein the database is located locally from the node.

4. The method of claim 1, wherein the database is located remotely from the event processor.

5. The method of claim 1, wherein the database is located locally from the event processor.

6. The method of claim 1, wherein the message is received from the event processor at the parent process.

7. The method of claim 1, wherein spawning the child process comprises:
   forking a first process;
   passing the message to the first process;
   using the first process to fork a second process to run the job.

8. An auto remote agent system for job scheduling and management applications, comprising scheduling and managing computer applications, comprising:
   an event processor operable to retrieve one or more jobs from a database, the one or more jobs scheduled to be run on a node that is located remotely from the event processor;
   an agent module residing on the node, the agent module operable to receive the one or more jobs from the event processor, the agent module further operable to create a process to run the job on the node, the agent module further operable to send one or more status messages associated with the job running on the node;
   wherein the creation of the process and the running of the process are performed without relying on operating system services and without relying on vendor-specific client software on the node, and
   wherein the agent module is further operable to send the one or more status messages directly to the event processor that is remote from the agent module, and wherein the event processor is further operable to perform processing on the status at the event processor and update the database with the status indicating that the process is running the job;
   wherein the agent module residing on the node that is remote from the event processor is further operable to:
   catch the exit code of the child process;
   terminate the child process at the remote agent; and
   pass a termination event to the event processor.

9. The system of claim 8, wherein the agent module sends the one or more status message to the event.

10. The system of claim 8, wherein the agent module sends the one or more status messages to the database.

11. The system of claim 8, wherein the agent node spawns a child process to run the job.

12. The system of claim 8, wherein the agent module comprises a parent process operable to spawn the process on the node without relying on operating system services.

13. The system of claim 12, wherein the parent process is operable to receive the message from the event processor.

14. The system of claim 8, wherein when creating the process, the agent module residing on the node that is remote from the event processor is operable to:
   fork a first process;

pass the message to the first process;
use the first process to fork a second process to run the job.

15. The system of claim 14, wherein the agent module residing on the node that is remote from the event processor is further operable to:
receive, by the second process, the exit code of the child process;
pass a termination event from the second process to the first process;
terminate the second process; and
pass the termination event from the first process to the event processor that is remote from the remote agent.

16. A program storage device readable by machine, tangibly embodying a program of instructions executable by the machine to perform an auto remote agent method for job scheduling and management applications, comprising:
receiving a message from an event processor to initiate a job on the node, the node located remotely from the event processor;
using a remote agent on the node to spawn a child process on the node, the child process not relying on operating system services and not relying on vendor-specific client software on the node;
causing the child process to run the job;
receiving status associated with the job from the child process;
providing the status for updating a database that includes one or more statuses of one or more jobs, wherein providing the status for updating the database comprises:
providing the status for updating the database directly from the remote agent on the node to the event processor that is remote from the remote agent;
performing processing on the status at the event processor that is remote from the remote agent; and
using the event processor to update the database with the status indicating that the child process is running the job;
catching the exit code of the child process;
terminating the child process at the remote agent; and
passing a termination event to the event processor.

17. The program storage device of claim 16, wherein the remote agent sends the one or more status message to the event processor.

18. The program storage device of claim 16, wherein the remote agent sends the one or more status messages to the database.

19. The program storage device of claim 16, further operable to:
providing a parent process on the node, the parent process operable to spawn the child process on the node without relying on operating system services.

20. The program storage device of claim 19, wherein the message is received from the event processor at the parent process.

21. The program storage device of claim 16, wherein spawning the child process comprises:
forking a first process;
passing the message to the first process;
using the first process to fork a second process to run the job.

22. The program storage device of claim 21, further comprising:
receiving, by the second process, the exit code of the child process;
passing a termination event from the second process to the first process;
terminating the second process; and
passing the termination event from the first process to the event processor that is remote from the remote agent.

23. An auto remote agent method for job scheduling and management applications, comprising:
receiving a message from an event processor to initiate a job on a node, the node located remotely from the event processor;
using a remote agent on the node to spawn a child process on the node, the child process not relying on operating system services;
causing the child process to run the job;
receiving status associated with the job from the child process;
providing the status for updating a database that includes one or more states of one or more jobs, wherein providing the status for updating the database comprises:
providing the status for updating the database directly from the remote agent to the event processor that is remote from the remote agent;
performing processing on the status at the event processor that is remote from the remote agent;
wherein spawning the child process comprises:
forking a first process;
passing the message to the first process; and
using the first process to fork a second process to run the job;
wherein the method further comprises:
receiving, by the second process, the exit code of the child process;
passing a termination event from the second process to the first process;
terminating the second process; and
passing the termination event from the first process to the event processor that is remote from the remote agent.

* * * * *